(12) United States Patent
Bolz et al.

(10) Patent No.: US 8,614,524 B2
(45) Date of Patent: Dec. 24, 2013

(54) ONBOARD POWER SUPPLY AND METHOD FOR OPERATING AN ONBOARD POWER SUPPLY

(75) Inventors: Stephan Bolz, Pfatter (DE); Carsten Götte, Pentling/Großberg (DE); Martin Götzenberger, Ingolstadt (DE)

(73) Assignee: Continental Automotive GmbH, Hannover (DE)

( * ) Notice: Subject to any disclaimer, the term of this patent is extended or adjusted under 35 U.S.C. 154(b) by 341 days.

(21) Appl. No.: 12/681,644

(22) PCT Filed: Sep. 19, 2008

(86) PCT No.: PCT/EP2008/062524
§ 371 (c)(1),
(2), (4) Date: Apr. 5, 2010

(87) PCT Pub. No.: WO2009/047103
PCT Pub. Date: Apr. 16, 2009

(65) Prior Publication Data
US 2010/0244556 A1    Sep. 30, 2010

(30) Foreign Application Priority Data
Oct. 9, 2007   (DE) .......................... 10 2007 048 342

(51) Int. Cl.
*B60L 1/00*   (2006.01)
*B60L 3/00*   (2006.01)
*H02G 3/00*   (2006.01)

(52) U.S. Cl.
USPC .......................................................... 307/9.1

(58) Field of Classification Search
None
See application file for complete search history.

(56) References Cited

U.S. PATENT DOCUMENTS 5,698,905 A * 12/1997 Ruthlein et al. ................ 290/32
(Continued)

FOREIGN PATENT DOCUMENTS

DE        4028242 A1     3/1992
DE       10019889 C1     9/2001
(Continued)

OTHER PUBLICATIONS

WO 0132473 to Mueller et al, english abstract, May 10, 2001.*

*Primary Examiner* — Carlos Amaya
(74) *Attorney, Agent, or Firm* — Laurence A. Greenberg; Werner H. Stemer; Ralph E. Locher

(57) ABSTRACT

An onboard power supply, contains a starter power supply having a high-power load, particularly a starter and a first energy storage, particularly a double-layer capacitor. The onboard power supply further has an intermediate power supply with a second energy storage, particularly a rechargeable lithium polymer battery and a load power supply with at least one electric load. The starter power supply is electrically coupled to the intermediate power supply via a first voltage converter. The intermediate power supply is electrically coupled to the load power supply via a second voltage converter, and the onboard power supply has a controller, which controls or regulates the electric voltage in the intermediate power supply in dependence on a parameter of the second energy storage.

9 Claims, 3 Drawing Sheets

(56) References Cited

U.S. PATENT DOCUMENTS

| | | |
|---|---|---|
| 6,476,315 B2 | 11/2002 | Ganz |
| 6,507,506 B1 | 1/2003 | Pinas et al. |
| 6,765,306 B2 * | 7/2004 | Fattic .................. 290/40 C |
| 7,436,080 B2 | 10/2008 | Hackl et al. |
| 2001/0035757 A1 * | 11/2001 | Maeckel et al. ............ 324/426 |
| 2003/0106883 A1 * | 6/2003 | Sangwan et al. ............ 219/203 |
| 2004/0112320 A1 | 6/2004 | Bolz et al. |
| 2006/0145536 A1 * | 7/2006 | Hackl et al. ............... 307/10.1 |

FOREIGN PATENT DOCUMENTS

| | | | |
|---|---|---|---|
| DE | 10305939 | A1 | 8/2004 |
| DE | 010225042654 | * | 3/2007 |
| DE | 102005042654 | A1 | 3/2007 |
| EP | 1318590 | A2 | 6/2003 |
| WO | 2004070911 | A1 | 8/2004 |
| WO | 2007028755 | A1 | 3/2007 |

* cited by examiner

ONBOARD POWER SUPPLY AND METHOD FOR OPERATING AN ONBOARD POWER SUPPLY

BACKGROUND OF THE INVENTION

Field of the Invention

The invention relates to an onboard power supply and to a method for operating an onboard power supply having a number of sub-supplies and at least one high-power load.

The increasing demands imposed in recent years by electrical loads in the areas of safety and convenience have meant that motor vehicle power supplies with lead-acid batteries are reaching the limits of their performance.

In a normal motor vehicle power supply nowadays all suppliers and consumers of energy have a common voltage level of nominally 12 V. Energy is exchanged between the individual components via a common power level.

Provided the internal combustion engine is running and this engine is driving the generator, the generator caters for all the demands for electrical energy. The lead-acid battery caters for additional demand peaks and thus operates as energy storage. When the vehicle is stationary the lead-acid battery takes over the supply of energy for the motor vehicle.

Because of the performance data the growing demands on the supply of energy in a motor vehicle would lead to an increase in the capacity of the energy storage, but this runs counter to the desire to reduce the weight of the motor vehicle.

In such cases, a first step has initially been to decouple the supply of energy to the starter from the conventional lead-acid battery. To this end a further energy storage, generally a double-layer capacitor, is provided which supplies the starter with energy and is recharged via a voltage converter from the motor vehicle's onboard power supply and the lead-acid battery disposed therein.

However the onboard power supply must have a relatively large and heavy lead-acid battery for this purpose. Smaller and lighter lithium-ion batteries or lithium-polymer batteries prove difficult to use since these batteries make a relatively high demand on precise adherence to a particular charge voltage.

Furthermore voltage converters are required which are also able to charge the double-layer capacitor from a voltage of 0 volts up to a maximum voltage. In such cases a significant outlay in electronics is required for the voltage converter, especially for the case in which the lead-acid battery is deeply discharged or defective, which causes the voltage of the lead-acid battery to drop to between 8 and 10 volts. In this case a charge voltage of the double-layer capacitor which lies above the voltage of the battery is required for successfully starting the engine.

BRIEF SUMMARY OF THE INVENTION

The object of the invention is to create a power supply and a method for operating the power supply which is suitable for meeting future requirements, especially leading to a weight reduction and allowing longer periods of inactivity.

Accordingly a power-supply is proposed with the following features:
 a starter power supply having a high-power load, particularly a starter and a first energy storage, particularly a double-layer capacitor;
 an intermediate power supply having a second energy storage, particularly a lithium-polymer battery;
 a load power supply with at least one electrical load,
 wherein the starter power supply is electrically coupled to the intermediate power supply via a first voltage converter,
 wherein the intermediate power supply is electrically coupled to the load power supply via a second voltage converter and the onboard power supply has a controller which controls or regulates the electrical voltage in the intermediate power supply as a function of a parameter.

An electrical coupling is achieved in particular by an inductive or a galvanic connection.

Furthermore a method for operating the onboard power supply is proposed which is designed so that the electrical voltage in the intermediate power supply is controlled or regulated as a function of a parameter.

In addition a method is proposed in which the electrical voltage in the load power supply is controlled or regulated as a function of the operating mode of an internal combustion engine via the second voltage converter or the generator.

One advantage of the present invention lies in the fact that the intermediate power supply is decoupled from the load power supply by the voltage converter. An energy storage can thus be used in the intermediate power supply of which the voltage, stability and/or charge voltage is independent of the requirements of the onboard power supply.

Advantageous embodiments and developments of the invention emerge from the subclaims and from the description, which refer to the drawings.

In accordance with a preferred embodiment of the invention a lithium-ion battery or a lithium-polymer battery of which the charge voltage is above the voltage of the onboard power supply is used in the intermediate power supply. Preferably a lithium-polymer battery is provided here having six cells with 3.7 volts each, which produces a nominal voltage of 22 volts. The actual charge voltage is then 25.2 volts.

Furthermore in a preferred embodiment the second voltage converter can be embodied so that the maximum permissible charge voltage of the second energy storage is maintained with the required accuracy and overcharging of the second energy storage or damage to it is thereby excluded.

This also means that in the event of a fault, especially with a short circuit of the second voltage converter, the second energy storage cannot be overcharged by this method, by which the safety of the system is further improved.

In a further preferred embodiment the voltage of the intermediate power supply lies above the voltage of the onboard power supply, whereby the first and/or the second voltage converter can be embodied as step-down converters. This results in a reduction in components and also in costs.

In accordance with a further preferred embodiment the second voltage converter is operated so that the load power supply can be stabilized by the latter. Short-duration current and voltage fluctuations, which arise for example from a load being accepted or rejected, can be quickly regulated out by inclusion of the second energy storage.

In a further embodiment a third voltage converter is connected in parallel with the second voltage converter, with energy being supplied via the third voltage converter to the load power supply in an idle state. The onboard power supply can in particular feature a wake-up circuit which switches the second voltage converter on or off depending on the energy requirement in the load power supply.

The parameters included for control or regulation of the power in the intermediate power supply preferably involve the voltage via the second power supply, the current flowing into or out of the second energy storage, a state of charge, a state of health of an energy storage, especially of the second energy storage and/or an operating parameter or operating state of a motor vehicle.

In accordance with a preferred embodiment, the control device can also control or regulate the voltage in the starter power supply in accordance with a preferred embodiment independently of the voltage in the intermediate power supply.

Furthermore in a preferred embodiment the load power supply can feature a generator. The generator can—especially with an onboard motor vehicle power supply—supply the loads with energy when an internal combustion engine connected to the generator is operating.

In accordance with a further preferred embodiment the load power supply features an intermediate circuit capacitor, especially an electrolytic capacitor, which is connected in parallel with at least one load of the onboard power supply. The alternating current resistance of the circuit arrangement is reduced by the second energy storage of the intermediate power supply and the second voltage converter, whereby the filter effect in relation to high-frequency noise components is increased.

In accordance with a further preferred embodiment the voltage of the load power supply can be reduced in the idle state of the motor vehicle. The load power supply voltage can be selected so that the control devices active in the idle state can be supplied with the voltage needed in this operating state. In this way the idle time of the vehicle can be significantly increased with the capacity of the energy storage remaining the same.

The invention is explained below in greater detail on the basis of the exemplary embodiments specified in the schematic figures of the drawing. The figures show:

BRIEF DESCRIPTION OF THE SEVERAL VIEWS OF THE DRAWING

In all figures—unless stated otherwise—the same elements and facilities or those with the same functions respectively are provided with the same reference signs.

DESCRIPTION OF THE INVENTION

Figure 1:
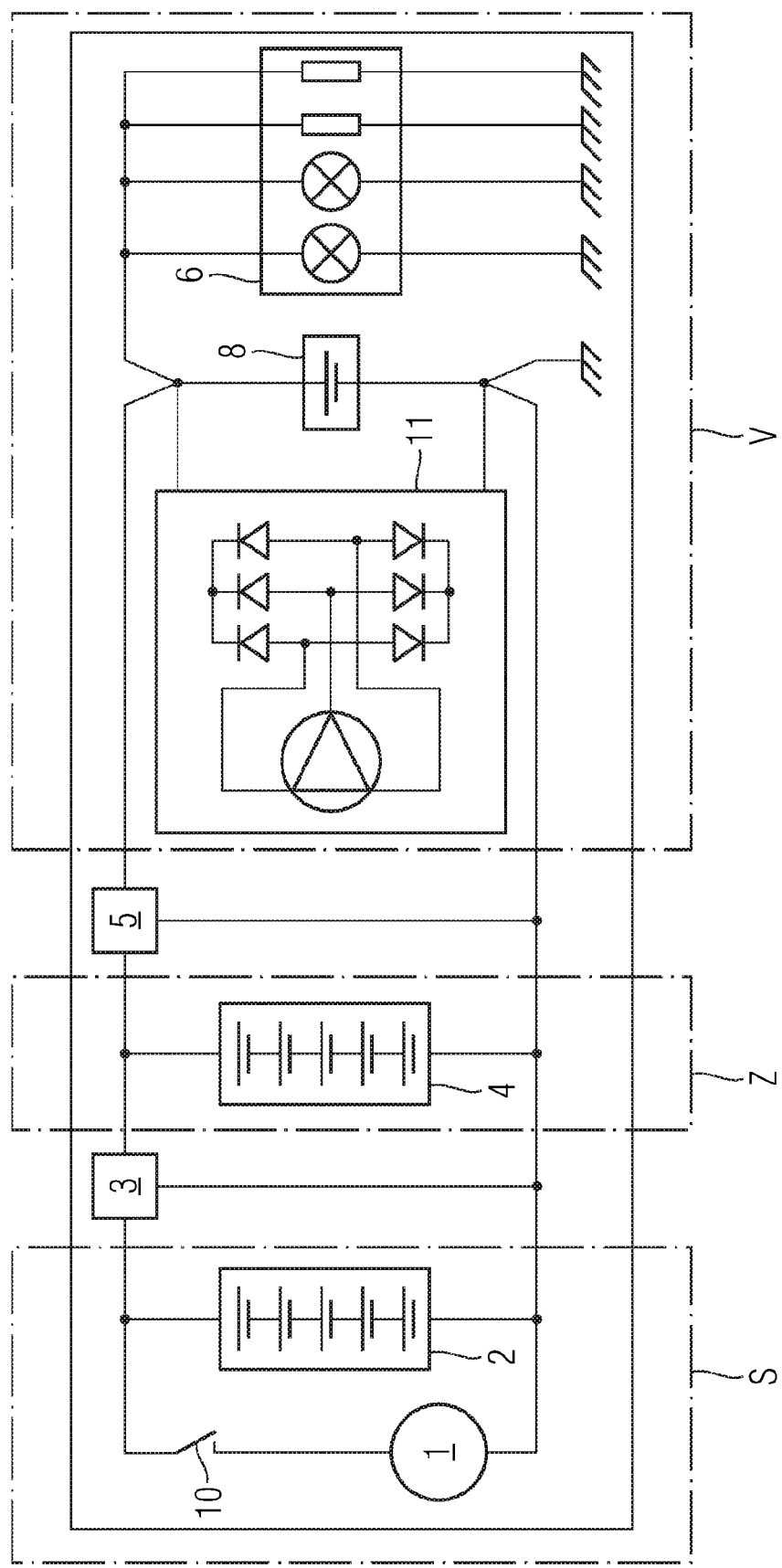
FIG. 1 a schematic block diagram of a first exemplary embodiment of an onboard power supply.

FIG. 1 shows an onboard power supply featuring a high-power load, here a starter 1, to which a first energy storage 2 is connected in parallel. The starter is usually an electrical direct current machine, which is coupled mechanically via gearing or a belt to the crankshaft of an internal combustion engine. The electrical connection between the second energy storage 2 and the starter 1 can be opened and closed via a switch 10, usually a relay.

The first energy storage 2 involves an energy storage with a high power density, especially a double-layer capacitor (Super Cap).

The first energy storage 2 is electrically connected via a first voltage converter 3 to a second energy storage 4. This second energy storage 4 involves an energy storage with a high energy density, especially a lithium-polymer or a lithium-ion battery. The second energy storage 4 is connected via a second voltage converter 5 to at least one electrical load 6, shown schematically in this diagram as a block. Arranged in parallel to the loads 6 in the exemplary embodiment shown here is an intermediate circuit capacitor 8, serving in particular for smoothing high-frequency noise components.

In the exemplary embodiment shown here starter 1 and the first energy storage 2 form what is referred to as the starter power supply. The second energy storage 4 forms the intermediate power supply Z and the at least one load forms the load power supply V. FIG. 1 shows a number of electrical loads connected in parallel, with these loads particularly involving loads of a motor vehicle onboard power supply.

The power supplies are separated according to the required power or the required energy. In the diagram shown here the first energy storage 2 is designed to have a high power output. The second energy storage 4 by contrast is designed so that it has high capacity and can output energy over a longer period.

In addition the load power supply V features a generator 11 which is arranged in parallel to the loads 6. In the exemplary embodiment in accordance with FIG. 1 the second voltage converter 5, the generator 11 and the least one load 6 are directly connected to one another. The voltage $U_v$ in the load power supply V can be controlled or regulated both by the generator 11 and also by the second voltage converter 5.

Figure 2:
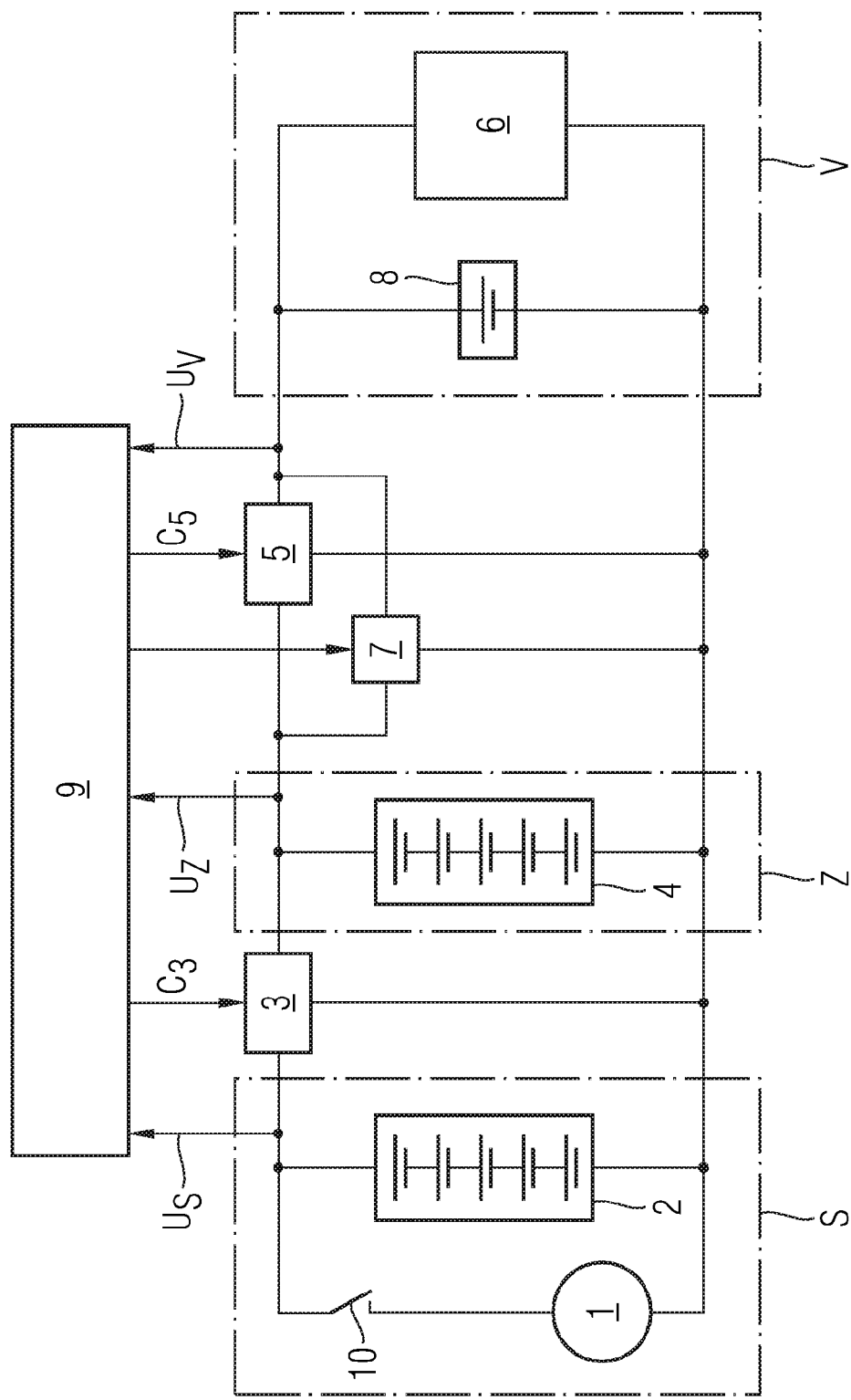
FIG. 2 a schematic block diagram of a second exemplary embodiment of an onboard power supply and FIG. 3 a schematic block diagram of a third exemplary embodiment of an onboard power supply.

In the exemplary embodiment shown in FIG. 2 a third voltage converter 7 is arranged in parallel to the second voltage converter 5 via which the load power supply V can likewise be supplied from the intermediate power supply Z. This third voltage converter 7 supplies the onboard load power supply V with energy in the idle state. Under these conditions the power consumption of the load power supply V is monitored and if necessary the second voltage converter 5 is woken up or switched on. The onboard power supply further features a control device 9 which monitors the voltage $U_s$ in the starter power supply S, the voltage $U_z$ in the intermediate power supply Z and the voltage $U_v$ in the load power supply V. In particular the control device 9 controls or regulates the voltage converters 3, 5 and/or 7, as a function of a parameter P, the voltage $U_s$, $U_z$ and/or $U_v$, a current $I_2$ and/or $I_4$ flowing into or out of the first or the second energy storage 2, 4, as well as a state of charge (SOC) and/or a state of health (SOH) of the first and/or second energy storage 2, 4 via control signals $C_3$, $C_5$ and/or $C_7$.

The second energy storage 4 with high energy density is electrically coupled on one side via the second voltage converter 5 to the supply network of the voltage converters 3, 5 and/or 7 and on the other side by the first voltage converter 3 to the starter power supply S.

Figure 3:
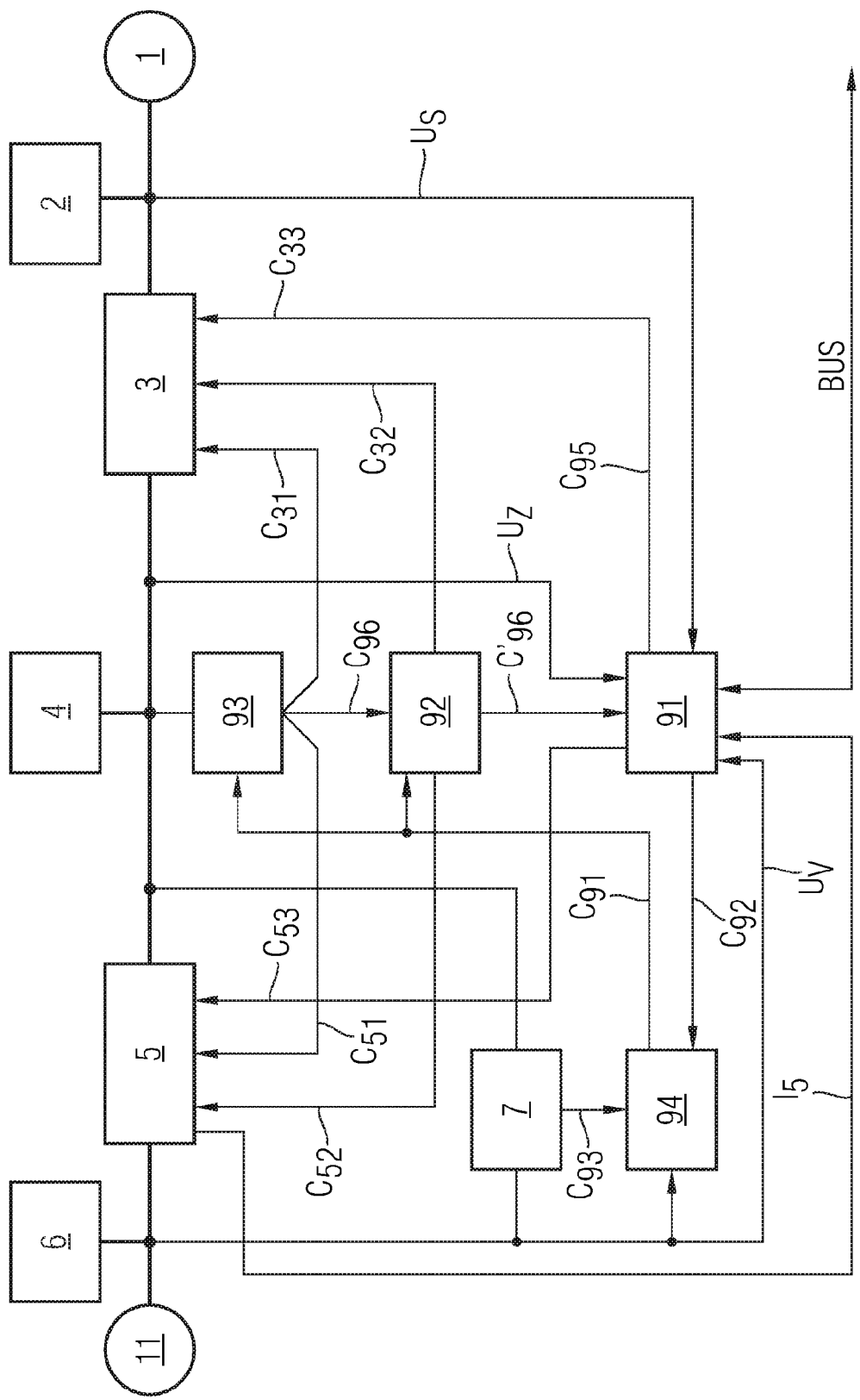

FIG. 3 shows a further exemplary embodiment of an onboard power supply. This involves a more detailed diagram of the second exemplary embodiment depicted in FIG. 2 which also contains elements from the first exemplary embodiment in accordance with FIG. 1.

The invention is not restricted here to the three preferred exemplary embodiments. Instead combinations of these three exemplary embodiments are also conceivable.

In the third exemplary embodiment in accordance with FIG. 3 the control device 9 is shown in greater detail. In this diagram it has a main control unit 91, a driver 92, a main switch 93 and a wake-up circuit 94. The main control unit 91 features a number of inputs, especially voltage inputs for the voltage $U_v$ in the load power supply V, the voltage $U_z$ in the intermediate power supply Z and the voltage $U_s$ in the starter power supply S. Furthermore the main control unit 91 has an input for monitoring the current $I_5$ flowing through the second voltage converter 5. The main control unit monitors the state of charge (SOC) of the first and/or the second energy storage 2, 4. The main control unit 91 is also serves to enable the onboard power supply to communicate with the other systems of the motor vehicle. A communication bus BUS is provided for this purpose, via which the onboard network can typically communicate with a central control device of the motor vehicle.

Furthermore the main control unit 91 has a number of outputs. In particular the wake-up circuit 94 is controlled by the main control unit via the control signal $c_{92}$. Via the control signal $C_{92}$ the main control unit 91 can in particular determine whether a change from operating into idle mode is permissible. The control signal $C_{92}$ can be influenced here especially as a function of an operating state of the motor vehicle.

The driver circuit 92 is controlled via a further control line $C_{94}$, which in its turn controls the power semiconductors of the first or second voltage converter 3, 5 respectively via its outputs $C_{32}$ and $C_{52}$. In operating mode the first and/or second voltage converter 3, 5 is controlled via the driver circuit such that the average surplus of energy is fed to the first and/or second energy storage 2, 4 in a suitable manner.

For example the first voltage converter 3 can be controlled so that after a start the first energy storage 2 will be recharged for a subsequent start attempt. Furthermore the first energy storage 2 can be discharged down to a minimum voltage $U_{Zmin}$ after the internal combustion engine is switched off or in the event of the motor vehicle being put into an idle state. The lifetime of the first energy storage 2 is increased in this way. Via the control lines $C_{31}$, $C_{51}$ and $C_{96}$ the main switch 93 can turn on or turn off the first and/or second voltage converter 3, 5, the driver circuit 92 and/or the main control device 91. The main switch 93 serves to minimize energy consumption in idle mode.

The wake-up device serves to switch over the onboard power supply from an operating mode into an idle mode. For this purpose the wake-up circuit 94 features a wake-up input $C_{93}$. Via this wake-up input $C_{93}$ the wake-up circuit receives a signal $C_{93}$ from the third voltage converter 7 that there is an increased demand for energy in the onboard power supply. As a result the main switch 93 and the driver circuit 92 are controlled via the output $C_{91}$, whereby the second voltage converter 5 is switched on and by the voltage converter 5 the voltage $U_v$ in the load power supply V is stabilized. Furthermore the main control device 91 is also switched on via the input $C_{96}$, by which a monitoring and charge control of the first and second energy storage 2, 4 is started. The onboard power supply can communicate with other control devices via the data interface BUS of the main control unit 91, and transmit status and diagnostic information. The driver can also be informed about a fault for example.

Furthermore the state of charge SOC of the second energy storage 4 can be monitored so that for a motor vehicle which is stationary and for a high discharge current (for example during "ignition on") the threat of a deep discharge is recognized and this can be communicated to other control devices or the driver for an information signal. As a result of such a threat of a deep discharge further electrical loads not relevant to functions or safety can be switched off and in this way the off-the-road time of the onboard power supply can be extended. Thus for example on reaching a discharge limit, especially a minimum voltage, the second voltage converter 5 can be switched off in order to prevent damage to the first and/or second energy storage 2, 4.

The voltage $U_v$ in the load power supply V can be freely selected independently of the voltage of the first and/or second energy storage 2, 4. Voltage fluctuations in the load power supply V can preferably be compensated for via the second voltage converter 5.

The invention claimed is:

1. An onboard power supply, comprising:
   a starter power supply having a starter and a first energy store;
   an intermediate power supply having a second energy storage;
   a load power supply having at least one electrical load and a generator operated by an internal combustion engine;
   a first voltage converter electrically coupling said starter and said first energy store of said starter power supply to said intermediate power supply;
   a second voltage converter electrically coupling said intermediate power supply to said load power supply; and
   a control device set up for one of controlling or regulating an electrical voltage in said intermediate power supply in dependence on a parameter, said control device one of controlling or regulating a voltage in said load power supply in dependence on a mode of operation of the internal combustion engine via at least one of said second voltage converter or said generator.

2. The onboard power supply according to claim 1, wherein the parameter involves at least one of the electrical voltage via said second energy storage, a current flowing one of into and out of said second energy storage, a state of charge of said second energy storage, a state of health of said second energy storage, an operating parameter of a motor vehicle and an operating state of the motor vehicle.

3. The onboard power supply according to claim 1, wherein said control device is set up to one of control or regulate at least one of a voltage in said starter power supply and the voltage in said load power supply independently of the electrical voltage in said intermediate power supply.

4. The onboard network according to claim 1, wherein:
   said second energy storage is selected from the group consisting of a lithium-ion battery and a lithium-polymer battery; and
   the parameter is a parameter of said second energy storage.

5. The onboard network according to claim 4, wherein said first energy storage is a double-layer capacitor.

6. The onboard network according to claim 1, wherein said control device is set up to switch said second voltage converter on or off in dependence on an energy requirement in said load power supply.

7. An onboard power supply, comprising:
   a starter power supply having a starter and a first energy store;
   an intermediate power supply having a second energy storage;
   a load power supply having at least one electrical load and a generator operated by an internal combustion engine;
   a first voltage converter electrically coupling said starter power supply to said intermediate power supply;
   a second voltage converter electrically coupling said intermediate power supply to said load power supply;
   a control device set up for one of controlling or regulating an electrical voltage in said intermediate power supply in dependence on a parameter, said control device one of controlling or regulating a voltage in said load power supply in dependence on a mode of operation of the internal combustion engine via at least one of said second voltage converter or said generator; and
   a third voltage converter connected in parallel to said second voltage converter, and in an idle state, said load power supply is supplied with energy via said third voltage converter.

8. The onboard power supply according to claim 7, wherein said control unit has a wake-up circuit being set up to switch said second voltage converter on or off.

9. The onboard network according to claim 7, wherein said control device is set up such that energy is supplied to said load power supply via said third voltage converter when said second voltage converter is switched off.

\* \* \* \* \*